J. C. TAYLOR.
TIRE.
APPLICATION FILED JUNE 11, 1906.
920,216.
Patented May 4, 1909.
2 SHEETS—SHEET 1.
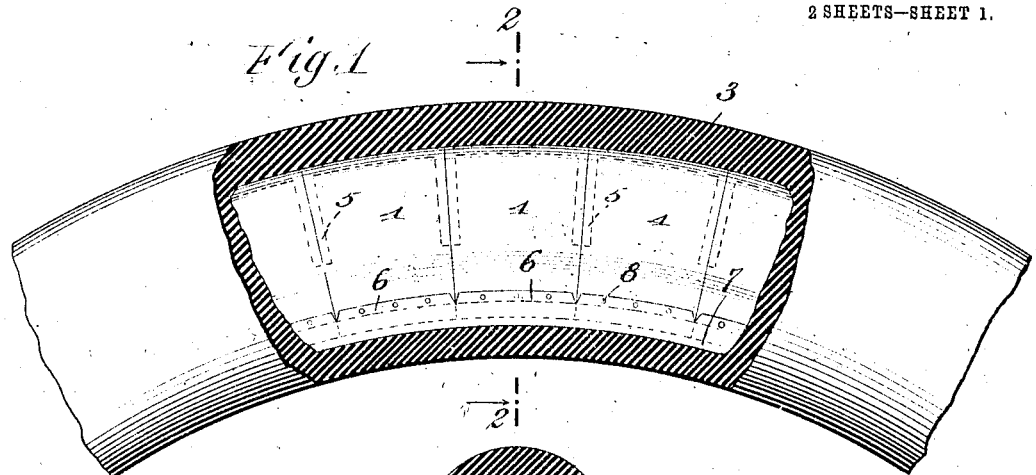
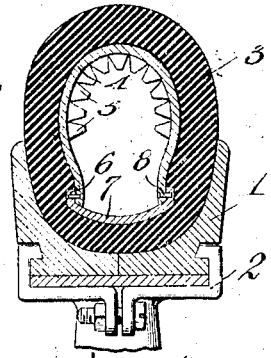
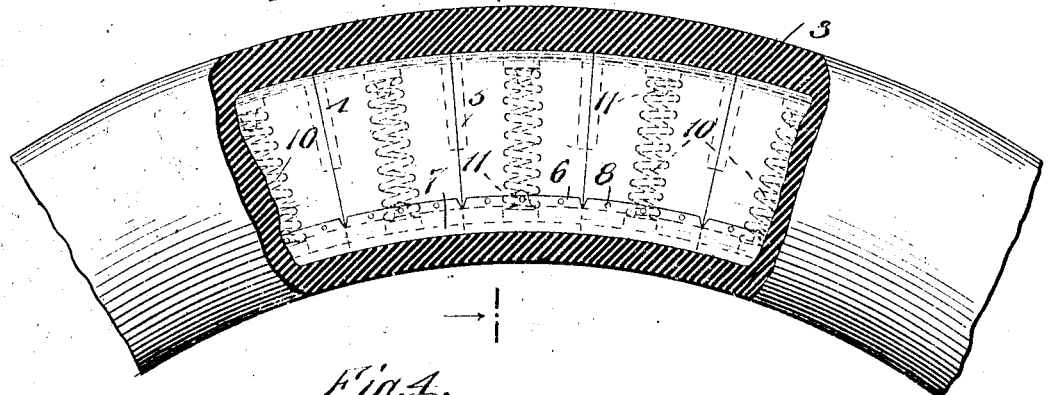
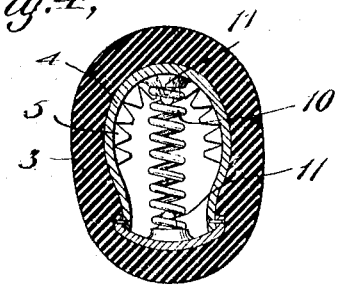
WITNESSES:
INVENTOR
Jos. C. Taylor
BY
ATTORNEY J. C. TAYLOR.
TIRE.
APPLICATION FILED JUNE 11, 1906.
920,216.
Patented May 4, 1909.
2 SHEETS—SHEET 2.
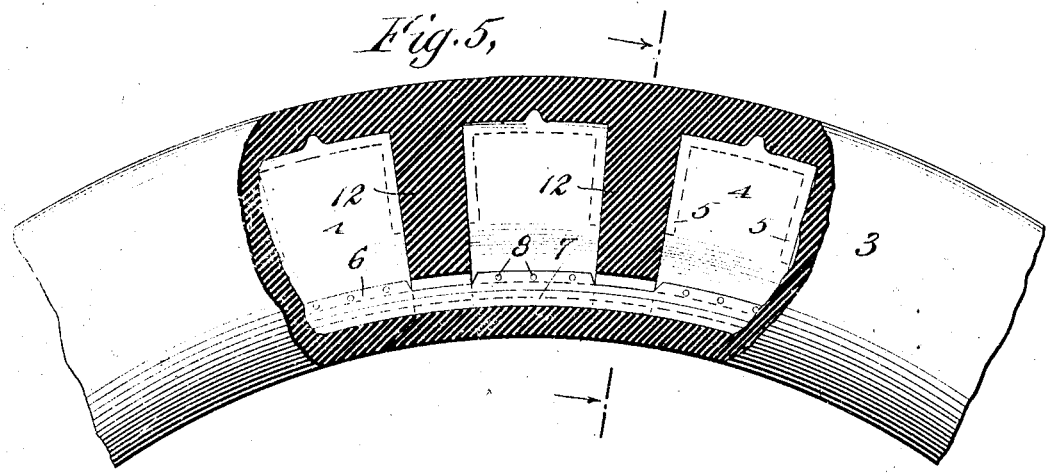
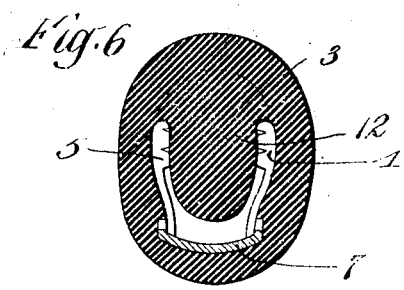
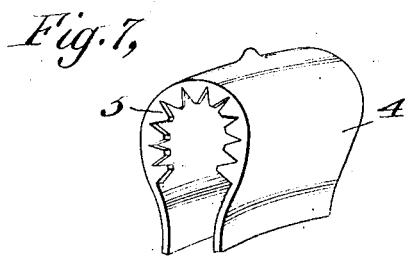
WITNESSES:
INVENTOR
Jos. C. Taylor
BY
ATTORNEY

UNITED STATES PATENT OFFICE.

JOSEPH C. TAYLOR, OF NEW YORK, N. Y.

TIRE.

No. 920,216.  Specification of Letters Patent.  Patented May 4, 1909.

Application filed June 11, 1906. Serial No. 321,208.

*To all whom it may concern:*

Be it known that I, JOSEPH C. TAYLOR, a citizen of the United States, residing in the borough of Brooklyn, city and State of New York, have invented certain new and useful Improvements in Tires, of which the following is a specification.

This invention relates to tires for the wheels of vehicles and its object is to provide a tire which, while possessing the requisite strength and resiliency, can be manufactured at a much less cost than tires of the types now in general use.

The invention contemplates securing the necessary resiliency by mechanical means rather than by inflating the tube or the inner one of two tubes as in this way, not only is the cost of the completed tire reduced but all danger of disabling the tire by puncture is avoided.

In accordance with my invention, an outer tube or shoe is employed which may be similar to those now in common use or of a type better adapted for use with the other parts of my invention as hereinafter described. Within this outer tube or shoe is a sectional inner tube consisting of a plurality of tube-sections of sheet-metal so formed and positioned as to yieldingly support the tread of the shoe. Each of these tube-sections may be formed in two parts, the ends thereof being interlocked or riveted together and, being of sheet-metal, they can be stamped out rapidly and at small cost. In order to hold the tube sections against displacement, I may provide spacers for holding the tube sections in their proper relative positions; preferably, however, I arrange the tube sections side by side to form a complete tube and in this case, I provide teeth integral with the sections which teeth may be bent at a right angle thereto to prevent the sections from telescoping one within another. If it is desired to make the tube sections of thin metal, such that there would be danger of their collapsing if not provided with additional strengthening means, I may provide one or more springs within each tube section to assist in holding its outer wall in normal position and in returning it to that position should it be depressed.

My invention will be better understood by reference to the accompanying drawings which show the preferred embodiment thereof and in which—

Figure 1 is a sectional elevation of my improved tire, Fig. 2 is a transverse section on line 2—2 of Fig. 1, Figs. 3 and 4 are views similar to Figs. 1 and 2 showing a modification, Figs. 5 and 6 are views similar to Figs. 1 and 2 showing a further modification and Fig. 7 is a perspective view of one of the plates of an inner tube section.

Referring to these drawings, 1 indicates the felly of the wheel which may be in two parts and may be held together and on the rim of the wheel by adjustable clamps 2. The tire is supported on this felly and consists of an outer tube 3 and an inner tube made up of a plurality of metallic tube-sections. The outer tube or shoe 3 may be of any of the types now in use and may have ribs at its sides adapted to enter corresponding grooves in the felly to clench the shoe thereto and hold it against displacement under the severe strain to which it is subjected. Or, the shoe may be annular in cross-section as shown in the drawings, the tube being made open at one point for insertion of the parts of the sectional inner tube and this opening being afterward sealed, as by vulcanizing. Preferably, however, the tire is constructed by assembling the parts of the inner tube and then molding the outer tube or shoe thereon.

Each of the sections of the inner tube consists of two sheet metal plates secured together in any suitable manner as by interlocking, brazing, or riveting their engaging edges. The tread plate 4 for a section is shown in perspective in Fig. 7; it consists of a sheet-metal punching of greatest width at the middle thereof and tapering somewhat in either direction from this line of greatest width to the edges so that when the sections are assembled the lateral edges of adjacent sections will be in engagement throughout their entire length, as shown in Fig. 1. On both sides of the plate are integral teeth 5 which are bent at an angle of substantially ninety degrees to the body of the plate as shown. The plate thus formed is bent to the curvature shown in Fig. 2 and its ends sprung under flanges 6 on the other plate 7 of the section which is also a sheet-metal punching and is curved somewhat between the flanges 6. The overlapping edges of the two plates may be secured together by rivets 8 or by brazing or interlocking. A plurality of tube sections 4 thus constructed, are arranged within shoe 3 side by side so that the lateral edges of each section and the teeth thereon engage those of the adjacent sections, as shown in Fig. 1. This is preferably done by assembling the tube sections and holding the outer tube upon the sectional inner one. The tire may then be positioned on the felly of the wheel in the usual way, as by removing one of the parts of the felly, positioning the tire on the other part and then securing the removable portion of the felly in its proper relation by means of clamps 2.

The tire thus constructed, possesses ample strength and resiliency and as its resiliency is obtained by the elasticity of the metal plates of the inner tube and not by inflating with air, the inconvenience and delay of inflating and mending punctures is avoided. Furthermore, as it is unnecessary to guard against punctures, less costly outer tubes or shoes may be employed.

The form of my invention illustrated in Figs. 3 and 4 differs from that above described only in that spiral springs 10 are provided between the plates 4 and 7. These springs are arranged radially of the wheel so that when obstructions in the roadway depress the tread of the tire, they will assist the plates 4 to force the tread of shoe 3 back to its normal position. The springs are positioned by lugs 11 one on each of the plates of a tube section. In this form of my invention, the plates 4 and 7 may be made of lighter metal.

In Figs. 5 and 6 is shown a modification in which the sections of the inner tube are not side by side but are spaced apart by lugs formed integral with and depending from the under side of the shoe 3. These lugs 12 extend down between each pair of adjacent inner tube sections and hold the sections in their proper relative positions, the teeth at the sides of the sections preventing the edges thereof from cutting the material of the lugs. These lugs also assist in supporting and cushioning the movement of the tread of the tire, for when the tread is depressed by obstructions in the roadway an unusual amount, the ends of the lugs are brought into engagement with the opposite side of the tire and permit of further movement to only a slight extent, thus relieving the metallic tube section of excessive strain and assisting in returning the tread to normal position when the obstruction is passed.

Having described my invention what I claim as new and desire to secure by Letters Patent is:

1. A tire having an outer tube and a plurality of resilient, non-inflatable, substantially cylindrical tube-sections lying end to end within said tube, said sections being formed of sheet-metal and having integral, inwardly turned teeth at each end thereof to prevent the sections from telescoping, substantially as set forth.

2. A tire having an outer tube and a plurality of resilient, non-inflatable, tube-sections therein, each of said sections consisting of two sheet-metal plates united at their edges and each section having integral, inwardly turned teeth at its end, substantially as set forth.

3. A tire having an outer tube, a plurality of resilient, non-inflatable, tube-sections lying end to end within said tube each formed of two sheet-metal plates united at their edges and each having integral, inwardly turned teeth at the ends thereof, and a spring in each of said sections extending between opposite sides thereof, substantially as set forth.

4. A tire having an outer tube and a plurality of resilient, non - inflatable metallic tube-sections therein, each having integral inwardly-turned teeth at each end thereof, a spiral spring in each of said sections, and bosses on opposite walls of each section for positioning the ends of the spring, substantially as described.

5. A tire having an outer tube and a plurality of resilient, non-inflatable, metallic tube-sections therein each having integral inwardly-turned teeth at its ends and a spiral spring between the opposite walls, and each of said sections consisting of two sheet-metal plates, one having flanges at its lateral edges engaged by the lateral edges of the other plate, substantially as described.

This specification signed and witnessed this 4th day of June, 1906.

JOSEPH C. TAYLOR.

Witnesses:
J. McIntosh,
D. S. Edmonds.